United States Patent
Kurihara et al.

(10) Patent No.: US 6,340,443 B1
(45) Date of Patent: Jan. 22, 2002

(54) FINE PARTICLE/POLYESTER SLURRY MELT-KNEADED IN EXTRUDER WITH POLYESTER

(75) Inventors: Hideshi Kurihara; Seiichi Takao; Kazumoto Miyajima; Shinya Yamamoto; Toru Takase, all of Matsuyama (JP)

(73) Assignee: Teijin Limited, Tokyo (JP)

( * ) Notice: Subject to any disclaimer, the term of this patent is extended or adjusted under 35 U.S.C. 154(b) by 0 days.

(21) Appl. No.: 09/607,968

(22) Filed: Jun. 30, 2000

Related U.S. Application Data (63) Continuation of application No. 08/888,929, filed on Jul. 7, 1997, now abandoned.

(30) Foreign Application Priority Data

Jul. 5, 1996 (JP) ............................................. 8-176621

(51) Int. Cl.$^7$ ........................... B29C 47/38; C08K 3/22; C08L 67/02
(52) U.S. Cl. .................... 264/464; 425/381.2; 524/497; 524/539; 524/601; 524/847; 525/444
(58) Field of Search ................................. 524/497, 539, 524/601, 847; 525/437, 444; 264/464; 425/381.2

(56) References Cited

U.S. PATENT DOCUMENTS

| | | | |
|---|---|---|---|
| 4,539,389 A | 9/1985 | Kiriyama et al. | ............ 528/272 |
| 4,861,515 A | 8/1989 | Minamisawa et al. | . 252/299.01 |
| 4,877,819 A | 10/1989 | Kiyohara et al. | ............ 523/200 |
| 5,180,658 A | 1/1993 | Kiyohara et al. | ............ 430/533 |
| 5,298,355 A | 3/1994 | Tyagi et al. | ................. 430/110 |

FOREIGN PATENT DOCUMENTS

| | | |
|---|---|---|
| DE | 24 28 758 | 1/1976 |
| DE | 4120921 | 1/1993 |
| EP | 00 83 768 | 7/1983 |
| EP | 0327 768 A2 | 8/1989 |
| FR | 2 554 119 | 5/1985 |
| JP | 55-133431 | 10/1980 |
| JP | 63-105059 | 5/1988 |
| JP | 1-121329 | 5/1989 |
| JP | 1-173031 | 7/1989 |
| JP | 1-41170 | 9/1989 |
| JP | 2-34307 | 2/1990 |
| JP | 3-115352 | 5/1991 |
| JP | 3-115354 | 5/1991 |
| JP | 3-247631 | 11/1991 |
| JP | 04-7336 | 1/1992 |
| JP | 05-017563 | 1/1993 |
| JP | 7-62076 | 7/1995 |

*Primary Examiner*—Robert E. L. Sellers
(74) *Attorney, Agent, or Firm*—Rader, Fishman & Grauer, PLLC

(57) ABSTRACT

A polyester composition containing fine particles with an average size of 0.03–1.8 μm which have been surface-modified with polyester (B) of which less than 70 mole percent of the repeating units consist of ethylene terephthalate, butylene terephthalate or ethylene naphthalate units, in polyester (A) of which at least 70 mole percent of the repeating units consist of ethylene terephthalate, butylene terephthalate or ethylene naphthalate units. The composition has a filtration pressure increase rate of no greater than 10 kg cm$^2$/hr when filtered using a double layer of 2400 mesh wire filters with an inner diameter of 64 mmφ, a temperature of 290° C. and a filtration rate of 33.3 g/min.

7 Claims, 2 Drawing Sheets

FINE PARTICLE/POLYESTER SLURRY MELT-KNEADED IN EXTRUDER WITH POLYESTER

This application is a continuation of application Ser. No. 08/888,929 filed Jul. 7, 1997 abandoned.

BACKGROUND OF THE INVENTION

1. Field of the Invention

The present invention relates to a polyester composition and a process for its preparation, and more specifically it relates to a polyester composition containing uniformly dispersed particles with an average size of 0.03–1.8 μm, which is useful for molding of fibers, films and the like, and to a process for its preparation. The present invention also relates to an apparatus for preparation of the composition.

2. Description of the Related Art

Polyesters, particularly polyethylene terephthalate, polybutylene terephthalate and polyethylene-2,6-naphthalate, are widely used for fibers, films and other molded products because of their excellent physical and chemical properties. Despite these excellent properties, however, they are known to have problems of molding workability during the molding processes used to obtain such molded products, and to cause troubles including reduced workability due to undesirable slidability during handling of the molded products themselves and lower product quality.

In order to overcome these problems, a number of processes have been proposed whereby fine particles are added to the polyester to provide a suitable degree of irregularity to the molded product surface, to thus reduce the surface slidability of the molded products, and some of these processes have been practically applied. Examples include a process whereby inactive inorganic particles such as silicon oxide, titanium dioxide, calcium carbonate, talc, kaolinite, etc. are added to the polyester (for example, Japanese Unexamined Patent Publication No. 55-133431) and a process whereby heat-resistant polymer particles such as silicon particles or polystyrene particles are added to the polyester (for example, Japanese Unexamined Patent Publication No. 3-115354).

However, most of these processes for adding particles involve causing coarse particles to be contained in the composition. Yet, in the case of magnetic tape films, for example, mixture of coarse particles lowers the electromagnetic conversion characteristics, becoming a cause of dropouts. Also, in the case of films which must be transparent, such as films for plate-printing and microfilms, the transparency is notably reduced thus impairing the quality of the film. Such particles are not preferred for use in production of fibers since they can cause filter clogging during spinning, thus lowering the productivity and resulting in breaking of the monofilaments.

Measures for eliminating such coarse particles have been proposed for cases where particles are added during the synthesis reaction of the polyester, wherein the coarse particles are first removed by crushing and sorting and then added in the form of a slurry or solution. (For example, Japanese Examined Patent Publication No. 1-41170, Japanese Unexamined Patent Publication No. 63-105059). On the other hand, measures have also been proposed for cases where they are kneaded and mixed with the polyester after synthesis, wherein a single-rotary-member or twin-rotary-member extruder is used to add powdered particles while shear stress is applied to the polymer and powder particles. (For example, Japanese Unexamined Patent Publication No. 2-34307, Japanese Examined Patent Publication No. 7-62076).

Nevertheless, the former case not only involves high cost and longer working times for the crushing and sorting procedures, but even after those procedures have been sufficiently carried out, the particles reaggregate during and after the time that they are added to the polyester synthesis system, for which reason it is still difficult to avoid production of coarse particles in the polyester product. In addition, when particles are repeatedly added to a polyester synthesis system designed for mass production of a polyester, tremendous loss is experienced by washing, etc. of the polyester synthesis system each time the polyester brand is switched to a different brand.

On the other hand, in the latter case it is very difficult in practice to completely crush or shred the coarse grains of the powder grains using a single-rotary-member or twin-rotary-member extruder, and when too much shear stress is applied in order to evenly disperse the grains in the polyester, the intrinsic viscosity of the polyester is notably lowered, resulting in the problem of poor moldability or product quality.

In order to solve these difficulties, there have been proposed a process whereby a vented extruder is used to add to the polyester a slurry of inorganic particles of average size 0.01–5 μm in water and/or an organic compound with a boiling point of 200° C. or below (Japanese Unexamined Patent Publication No. 3-115352) and a process whereby a co-rotating twin-screw kneading extruder is used for molten kneading of the polyester with titanium oxide of average particle size 0.1–0.5 μm with the particles larger than 3 μm substantially eliminated by wet or dry sorting and/or wet crushing treatment (Japanese Unexamined Patent Publication No. 1-173031); however, a sufficient effect has still not been achieved.

SUMMARY OF THE INVENTION

It is an object of the present invention to provide a polyester composition with excellent dispersion of particles in the polyester, containing substantially no coarse particles and thus having excellent molding workability for the making of fiber, film and resin molded products, and which results in low monofilament breakage in the case of fibers, gives excellent slidability, film surface uniformity and abrasion resistance in the case of films, and gives excellent dimensional stability and impact resistance in the case of resin molded products, as well as a process and apparatus for its preparation.

According to the present invention there is provided a polyester composition which consists of polyester (A) defined below containing fine particles with an average size of 0.03–1.8 μm which have been surface-modified with polyester (B) defined below.

Polyester (A): a polyester of which at least 70 mole percent of the repeating units consist of ethylene terephthalate, butylene terephthalate or ethylene naphthalate units.

Polyester (B): a polyester of which less than 70 mole percent of the repeating units consist of ethylene terephthalate, butylene terephthalate or ethylene naphthalate units.

According to the present invention there is also provided a process for preparing a polyester composition which comprises feeding the above-mentioned polyester (A) and fine particles to a single-rotary-member or twin-rotary-member vented extruder and subjecting them to molten kneading, whereby a slurry of the fine particles of average size 0.03–1.8 μm and the above-mentioned polyester (B) is prepared in water and/or an organic compound with a boiling point of 240° C. or below, or a slurry of the fine particles with an average size of 0.03–1.8 μm which have been surface-modified with the above-mentioned polyester (B) is prepared in water and/or an organic compound with a boiling point of 240° C. or below, and then fed to the above-mentioned vented extruder.

According to the invention there is also provided an apparatus for preparation of the polyester composition, which consists of a vented extruder comprising a polyester resin loading port, a screw for molten kneading of the loaded polyester resin while transporting it, a cylinder which houses the screw and heats the transported polyester resin, and an introducing nozzle for introduction of the fine particle slurry into the heated polyester resin, which apparatus is provided with an outlet for discharge of the medium vapor generated from the slurry introduced into the cylinder, and provided with the introducing nozzle for the slurry in the outlet.

DESCRIPTION OF THE PREFERRED EMBODIMENTS

The polyester (A) constituting the major component of the polyester composition of the invention is a polyester selected from the group of polyesters wherein at least 70 mole percent of the repeating units consist of ethylene terephthalate, butylene terephthalate or ethylene naphthalate units.

Among the examples of third components which may be copolymerized with polyester (A) in a range of less than 30 mole percent, as acid components there may be mentioned terephthalic acid, isophthalic acid, 2,6-naphthalenedicarboxylic acid, 1,4-cyclohexanedicarboxylic acid, adipic acid, sebacic acid, phthalic acid, 5-sodiumsulfoisophthalic acid, 5-tetrabutylphosphoniumsulfoisophthalic acid and p-hydroxybenzoic acid.

As diol components there may be mentioned, for example, ethylene glycol, 1,4-butanediol, diethylene glycol, propylene glycol, 2,2-dimethyl-1,3-propanediol, dipropylene glycol, 1,6-hexanediol, 1,4-cyclohexanedimethanol, poly(ethylene oxide) glycol, poly(tetramethylene oxide) glycol, and ethylene oxide adducts of bisphenol A.

In addition, other polyvalent carboxylic acid compounds such as trimellitic acid, trimesic acid, pyromellitic acid, etc. and other polyvalent hydroxy compounds such as glycerin, trimethylolpropane, etc. may also be copolymerized in small amounts with the polyester (A) of the present invention.

The polyester (A) may be obtained from the aforementioned exemplary compounds or their precursors by common methods. That is, it may be produced by esterification reaction of a polyvalent carboxylic acid and polyvalent hydroxy compound followed by polycondensation at high temperature and reduced pressure, or by ester-interchange reaction of an ester-forming derivative of the polyvalent carboxylic acid with the polyvalent hydroxy compound followed by polycondensation at high temperature and reduced pressure.

The polyester (B) of the invention is a polyester of which less than 70 mole percent of the repeating units consist of ethylene terephthalate, butylene terephthalate or ethylene naphthalate units. Particularly preferred are linear polyesters prepared by synthesis from dicarboxylic acid components and diol components.

As the dicarboxylic acid components there may be mentioned, for example, terephthalic acid, 2,6-naphthalenedicarboxylic acid, isophthalic acid, 1,4-cyclohexanedicarboxylic acid, adipic acid, sebacic acid, phthalic acid, 5-sodiumsulfoisophthalic acid, 5-tetrabutylphosphoniumsulfoisophthalic acid, and p-hydroxybenzoic acid. Among these are preferred terephthalic acid, isophthalic acid and 5-sodiumsulfoisophthalic acid.

As the diol components there may be mentioned, for example, ethylene glycol, 1,4-butanediol, diethylene glycol, propylene glycol, 2,2-dimethyl-1,3-propanediol, dipropylene glycol, 1,6-hexanediol, 1,4-cyclohexanedimethanol, poly(ethylene oxide) glycol, poly(tetramethylene oxide) glycol, and ethylene oxide adducts of bisphenol A. Among these are preferred ethylene glycol, diethylene glycol and 1,4-butanediol.

In addition, other polyvalent carboxylic acid compounds such as trimellitic acid, trimesic acid, pyromellitic acid, etc. and other polyvalent hydroxy compounds such as glycerin, trimethylolpropane, etc. may also be copolymerized in small amounts with the polyester (B) of the present invention.

The polyester (B) may be obtained from the aforementioned exemplary compounds or their precursors by common methods. That is, it may be produced by esterification reaction of a polyvalent carboxylic acid and polyvalent hydroxy compound followed by polycondensation at high temperature and reduced pressure, or by ester-interchange reaction of an ester-forming derivative of the polyvalent carboxylic acid with the polyvalent hydroxy compound followed by polycondensation at high temperature and reduced pressure. The resulting polyester (B) is preferably soluble in slurry media and has an intrinsic viscosity of 0.5 or lower.

According to the invention, the fine particles with an average particles size of 0.03–1.8 μm which are added to polyester (A) may be either inorganic or organic particles. Typical inorganic particles include particles of silicon oxide in the form of colloidal silica, wet silica or dry silica, and of titanium oxide, calcium carbonate, kaolinite, China clay, talc, alumina, zeolite, graphite, feldspar, molybdenum disulfide, carbon black and barium sulfate. Typical organic particles include particles of polystyrene, polymethyl methacrylate, methyl methacrylate copolymer, crosslinked methyl methacrylate copolymer, polytetrafluoroethylene, polyvinylidene fluoride, polyacrylonitrile, benzoguanamine resin and crosslinked silicone resin. These particles may also have their surfaces coated with a different compound than that of the internal composition of the particles, as proposed for example in Japanese Unexamined Patent Publication No. 7-247119 and No. 4-7336, or they may be treated with a silane coupling agent and/or titanium coupling agent. Among these are preferred particles of silicon oxide, titanium oxide, alumina, polystyrene and crosslinked silicone resin, or these particles whose surfaces have been coated with other compounds. These particles may also be used in mixtures of two or more.

Specifically, when titanium oxide fine particles are used, the titanium oxide fine particles may consist of a mixture of anatase-type and rutile-type crystals. The titanium oxide fine particles may be surface treated with a publicly known hydrate of titanium, aluminum or silica, or they may be surface treated with a silane coupling agent, a titanium coupling agent or the organic treatment agent described in, for example, J. Macromol. Sci. Chem., A8, 621, 1974. As processes for preparing the titanium oxide fine particles there may be mentioned publicly known processes such as the sulfuric acid method, hydrochloric acid method and titanium alkoxide hydrolysis.

According to the invention, the particles are modified with polyester (B).

Specifically there may be mentioned processes whereby, 1) the particles are coated with polyester (B) or 2) a topochemical reaction is used to bond the polyester (B) to the particle surface or 3) the particles and polyester (B) are mechanochemically modified, but there is no restriction to these processes. That is, it is sufficient to incorporate a process whereby the polyester (B) and the particles are contacted at a stage prior to addition of the particles to the polyester (A), and there are no particular restrictions on the method used.

The particles are preferably added to polyester (A) in an amount of 0.01–70 wt %, more preferably 0.02–65 wt % and even more preferably 0.03–60 wt %, based on the weight of polyester (A). The proportion of polyester (B) to the particles is preferably 0.01–40 wt %, more preferably 0.05–35 wt % and even more preferably 0.1–30 wt %.

The polyester composition of the invention contains substantially none of the aforementioned fine particles of size 5.0 $\mu$m or greater, and for improved filtration performance it is preferred for the filtration pressure increase rate to be no greater than 10 kg/cm$^2$/hr, and especially no greater than 5 kg/cm$^2$/hr, when filtration is performed using a double layer of 2400 mesh wire filters with an inner diameter of 64 mm$\phi$, a temperature of 290° C. and a filtration rate of 33.3 g/min.

Preferably, the above-mentioned fine particles comprise, no more than 20,000 particles per milligram which have an equivolumetric sphere equivalent diameter of 3 $\mu$m or greater, no more than 220,000 particles per milligram which have an equivolumetric sphere equivalent diameter of 2 $\mu$m or greater, and an average particle size of 0.05–0.60 $\mu$m.

More preferably, the fine particles are prepared in the following manner. That is, the average particle size is 0.05–0.60 $\mu$m, preferably 0.05–0.50 $\mu$m and more preferably 0.05–0.43 $\mu$m, no more than 20,000 particles per milligram, preferably no more than 10,000 particles per milligram and most preferably no more than 5000 particles per milligram have an equivolumetric sphere equivalent diameter of 3 $\mu$ or greater, and no more than 220,000 particles per milligram, preferably no more than 130,000 particles per milligram and most preferably no more than 80,000 particles per milligram have an equivolumetric sphere equivalent diameter of 2 $\mu$ or greater. Further preferably, the number ratio of particles with an equivolumetric sphere equivalent diameter of 4 $\mu$m or greater to particles with an equivolumetric sphere equivalent diameter of 3 $\mu$m or greater is in the range of 1/5–1/2, while the number ratio of particles with an equivolumetric sphere equivalent diameter of 3 $\mu$m or greater to particles with an equivolumetric sphere equivalent diameter of 2 $\mu$m or greater is in the range of 1/10–1/2. Such a sharp particle distribution gives an especially excellent composition. As methods of adjusting the average particle size and the number of fine particles with an equivolumetric sphere equivalent diameter of 3 $\mu$m or greater and 2 $\mu$m or greater within these ranges there may be mentioned known crushing techniques, sorting techniques and filtering techniques, which may be carried out in dry systems or wet systems, or a combination of both.

The polyester composition of the invention has been described above, and the process for preparing the polyester composition will now be explained.

According to the preparation process for the polyester composition of the invention, the aforementioned particles are dispersed as a slurry, and either water and/or an organic compound with a boiling point of 240° C. or below may be used as the medium for dispersion. As organic compounds there may be mentioned alcohols such as methanol, ethanol, ethylene glycol and 1,4-butanediol, hydrocarbon compounds such as benzene, toluene and xylene, ethers such as tetrahydrofuran, 1,3-dioxolane, 2-methyl-1,3-dioxolane, β-hydroxyethylethyl ether and β-hydroxyethylmethyl ether, as well as esters, ketones, etc., among which are preferred ethylene glycol, 1,4-butanediol, tetrahydrofuran, 1,3-dioxolane, 2-methyl-1,3-dioxolane, β-hydroxyethylethyl ether and β-hydroxyethylmethyl ether. When making the particles into the slurry, the water and/or organic compounds may be used alone or in mixtures of 2 or more different types.

The slurry of the particles with the water and/or organic compound with a boiling point of 240° C. or below may be prepared by a conventional method. That is, preparation of the slurry of the particles with the water and/or organic compound with a boiling point of 240° C. or below may be followed by crushing and shredding combined with sorting. The crushing or shredding may instead be carried out after sorting. Alternatively, after crushing or shredding and/or sorting in a dry system, the art particles may then be made into a slurry with the water and/or organic compound with a boiling point of 240° C. or below. A suitable combination of a dry and wet system may also be employed. For example, the slurry may be prepared after crushing in a dry system, and then the sorting performed in a wet system, or the shredding and/or sorting may be carried out in a dry system followed by crushing in a wet system.

In order to obtain a uniform slurry, a dispersing agent may also be added within a range which does not hinder the effect of the invention. As specific examples of dispersing agents there may be mentioned sodium polystyrene sulfonate, sodium polyacrylate, carboxymethyl cellulose, polyvinyl alcohol, vinyl compound and carboxylic acid-based monomer copolymer salts, polyacrylic acid partial alkyl ester, polyalkylene polyamine, ammonia, various ammonia salts, sodium salts such as caustic soda, sodium hexametaphosphate and sodium pyrophosphate, and onium compounds such as tetraethylammonium chloride, tetramethylammonium hydroxide, tetramethylphosphonium bromide and tetrabutylphosphonium hydroxide.

According to an embodiment of the process of the invention, the slurry containing particles with an average size of 0.03–1.8 $\mu$m as described above contains polyester (B) preferably in dissolved form, and polyester (B) may be added at any desired point prior to feeding of the slurry to the vented extruder. For example, polyester (B) may be added at the start of preparation of the slurry, polyester (B) may be added at an intermediate stage in making the slurry, or the polyester (B) may be added after the slurry has been completed. Alternatively, the particles, the water and/or organic compound with a boiling point of 240° C. or below and polyester (B) may be mixed just before addition to the vented extruder, or they may be mixed during the addition. At such time, polyester (B) is preferably predissolved in the water and/or organic compound with a boiling point of 240° C. or below. The timing for addition of polyester (B) to the slurry is as explained above, and as long as a uniform slurry can be obtained it may be added before starting preparation of the slurry, during a preparation stage, or after completion of preparation. Here, there is no particular restriction on the concentration of the slurry of the water and/or organic compound with a boiling point of 240° C. or below containing the particles and polyester (B), but the slurry concentration is preferred to be higher, preferably 30 wt % or greater, from the standpoint of ease in removal of the water and/or organic compound with a boiling point of 240° C. or below from the vent openings after addition to polyester (A).

According to another embodiment of the invention, the particles are first modified with polyester (B) by the process described above and then made into a slurry with the water and/or organic compound with a boiling point of 240° C. or below, for addition to the vented extruder. Here, there is no particular restriction on the concentration of the slurry of the water and/or organic compound with a boiling point of 240° C. or below containing the particles modified with polyester (B), but the slurry concentration is preferred to be higher, preferably 20 wt % or greater, from the standpoint of ease in removal of the water and/or organic compound with a boiling point of 240° C. or below from the vent openings after addition to polyester (A).

However, the concentration of the above-mentioned slurry may more preferably be 50 wt % or greater. At 50 wt % or greater the processing efficiency for crushing, shredding and sorting is improved, while the frequency of collisions between particles in the slurry during crushing treatment is increased to give a slurry of excellent quality, having fewer coarse particles and a sharp particle distribution. A concentration of less than 50 wt % is not preferred because of problems including cost considerations and recovery of the solvent. If the slurry concentration is too high the slurry viscosity increases too much, creating difficulties in the case of wet processing, and therefore the specific upper limit is preferably 70 wt %.

The vented extruder in which the slurry is added to the polyester (A) is preferably an extruder provided with at least one vent opening, and it must have a kneading function. So long as it has this function it may be a single-screw type or twin-screw type, or a single-rotor type or twin-rotor type, or even a kneader. It may also employ a continuous system or batch system. At least one of the vent openings for removal of the water and/or organic compound with a boiling point of 240° C. or below must be kept at reduced pressure. The degree of reduced pressure is preferably 300 Torr or lower, more preferably 100 Torr or lower and particularly preferably 20 Torr or lower. The polyester composition obtained with such a vented extruder may then be fed to a fiber process to produce a fiber mold, to a thin-film process to produce a flat mold or to a molding process to produce a 3-dimensional mold, and it may also be made into pellets through a granulating step.

According to the process for producing the polyester composition of the invention described above, the polyester (A) may be fed to the vented extruder through the polymer loading port and melted, with the slurry fed to the extruder through a slurry introducing nozzle provided downstream from the polyester loading port or in the polymer loading port, for dispersion in the polyester resin, in which case it is particularly preferred to provide an outlet for discharge of the slurry medium vapor, introducing the slurry, through the slurry introducing nozzle which opens into the outlet while at least part of the polyester resin is in a non-molten state in the extruder.

The present invention also provides an apparatus which can be advantageously used for preparation of the polyester composition described above. A specific example of a vented extruder which is useful as such an apparatus will now be explained with reference to the attached drawings.

Figure 1:
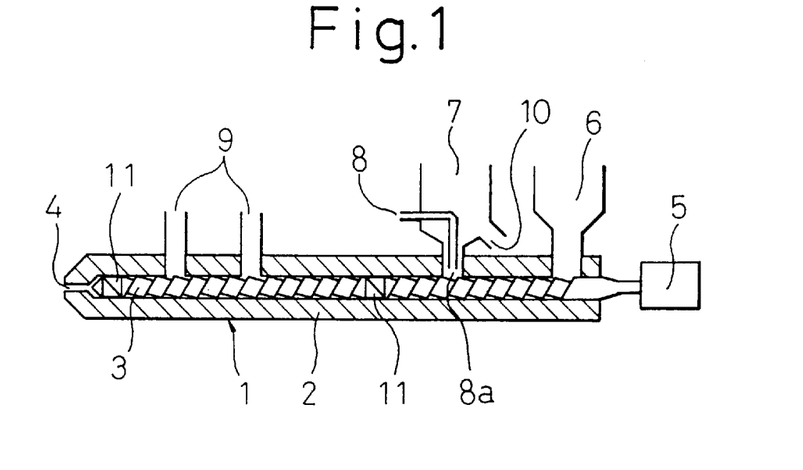
FIG. 1 is a side cross-sectional view of an embodiment of an apparatus for preparation of the polyester composition of the invention.
Figure 2:
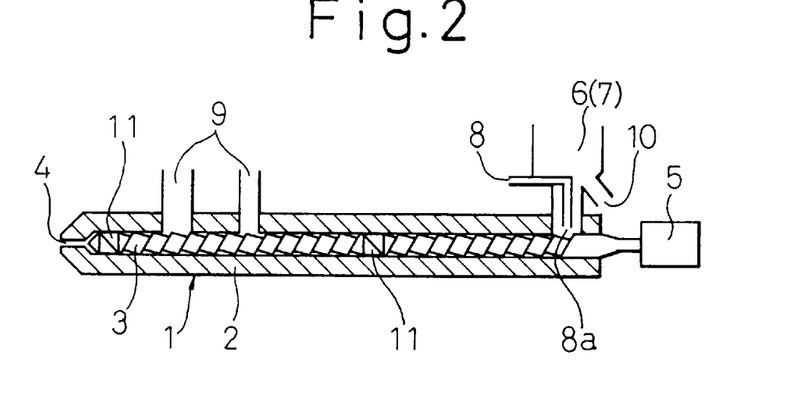
FIG. 2 is a side cross-sectional view of another embodiment of an apparatus for preparation of the polyester composition of the invention.
Figure 3:
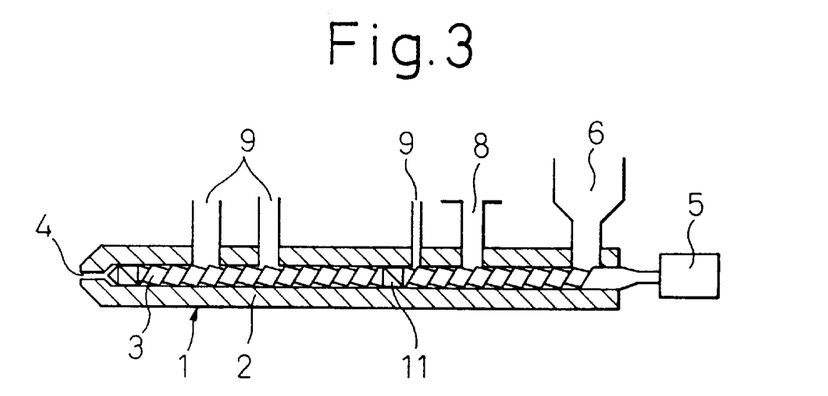
FIG. 3 is a side cross-sectional view of a conventional vented twin-screw extruder.

FIGS. 1 and 2 are side cross-sectional views of vented twin-screw extruders according to the invention, and FIG. 3 is a side cross-sectional view of a conventional vented twin-screw extruder. In these drawings, 1 represents the extruder body, 2 a heating cylinder, 3 a screw, 4 a polymer discharge port and 5 a screw driving motor. Also provided in the extruder 1 are a polymer loading port 6, a slurry vapor outlet 7, a slurry introducing nozzle 8 and vent openings 9 in that order from the upstream end toward the discharge port 4. Also, the slurry vapor outlet 7 is provided with a vent opening 10 which is open to the outside air or under negative suction. For sealing of the retained polymer and the vacuum section, a retrorse screw 11 (or sealing) of reverse orientation is provided after the slurry-added section and before the discharge port.

The vented extruder shown in FIG. 2 is a case where the polymer loading port 6 and the slurry vapor outlet 7 are provided together, instead of the separately provided polymer loading port 6 and slurry vapor outlet 7 shown in FIG. 1, and this case is also encompassed by the present invention.

In the vented twin-screw extruder 1 constructed in the manner described above, the polyester is loaded in the form of chips into the cylinder 3 of the extruder through the polymer loading port 6, and then transported toward the discharge port 4 by the screw 3. The loaded chips are then heated to softness, but may not be completely melted until the screw reaches the vapor outlet 7. That is, at least a portion thereof in the extruder may remain non-molten. This is because if it is completely molten the slurry may evaporate rapidly during addition of the slurry, and part of the molten polymer may cake and fly off, causing clogging of the slurry introducing nozzle 8. In other words, in the form of non-molten chips it is possible to avoid fly loss of the polymer.

An additional problem may be associated with the procedure for introducing the slurry. That is, an injection pressure of 10 kg/cm$^2$ or greater is necessary in order to forcibly add the slurry to the cylinder 3 at a pressure above the vapor pressure in the heating cylinder 2 (about 10 kg/cm$^2$). Attempting to apply such a procedure may not only introduce great danger into the operation of the extruder, but also produce a condition wherein the polymer under such high pressure undergoes sudden and drastic fly loss. Furthermore, since the introducing nozzle becomes stopped up by the flying polymer, clogging of the nozzle is promoted. Consequently, it is impossible to completely prevent clogging of the introducing nozzle as long as a conventional system is employed.

Here, in order to prevent such clogging of the nozzle, it is preferred to introduce the slurry at a location at which at least part of the polyester resin in the extruder 1 is in a non-molten state, through the slurry introducing nozzle 8 which opens into a slurry medium vapor outlet 7, as according to an embodiment of the invention. It is thus possible to associate the nozzle-clogging fine particles contained in the slurry and the flying polymer portions with the slurry medium vapor and discharge them, to thus prevent clogging of introducing nozzle.

In other words, the prepared slurry may preferably be added to the polyester through the slurry introducing nozzle 8 at the point where the polyester chips loaded through the polymer loading-port 6 reach the slurry vapor outlet 7. However, at this point, the opening edge of the slurry introducing nozzle 8 may preferably be always kept substantially separate from the softened or partially molten polymer being transported by driving of the screw 3. This is because if the nozzle opening contacts with the molten or softened polymer or the added slurry which form a layer around the rotating screw, the polymer and particles will constantly adhere to the opening section of the slurry inlet 8a, causing nozzle clogging and irregular slurry addition. The distance between the opening edge and the screw 3 may be at least 1 cm, and in order to provide a constant amount of slurry while preventing nozzle clogging, and promptly remove the vaporized slurry medium, it is preferably 1–20 cm, and more preferably 1–10 cm. If they are separated by more than 20 cm a problem may arise in terms of addition of a constant amount of slurry, giving greater occasion to disturbances and contamination by dirt. Since the distance between the nozzle tip and the screw depends on the amount of production, the polymer melting point, the slurry concentration and the internal cylinder temperature, the most suitable distance may be adjusted as appropriate for the operating conditions.

The shape of the slurry introducing nozzle 8 is not particularly restricted so long as there is no dead space or drift. Also, the diameter of the introducing nozzle 8 is preferably set so that the drip rate of the slurry is greater than the free-fall drop rate. This is because if the addition flow rate is less than the free-fall drop rate there is often no liquid seal in the nozzle 8, which can cause drift creeping on the side walls and therefore problems in the quantity of addition. A jacket is also preferably provided in the slurry introducing nozzle 8, and cold water, hot water, steam or heated medium may be passed through it, depending on the temperature of use, to maintain a constant temperature, and thus improve the stability, quantity and cleaning convenience of the added slurry.

As further explanation of a vented twin-screw extruder which is useful according to the invention, there is also provided a vent opening 10 in the slurry medium vapor outlet 7 into which opens the slurry inlet 8a of the extruder of the invention, and it serves to rapidly discharge and remove the generated slurry medium vapor. When removing the vapor, the vapor outlet 7 may be an open-air system for natural discharge, or it may employ an exhaust ventilator for forced exhaust. The exhaust rate at this time will depend on the production amount, the slurry addition rate, the cylinder temperature, the exhaust volume and the exhaust port size, and therefore it may be appropriately adjusted to suit these conditions, within a range which does not result in droplet association. Also, the vapor outlet 7 may be provided not only at one location but at many locations, as multiple locations are suitable when it is desired to add the slurry in even greater amounts or to add 2 or more different types of slurry compositions.

The polymer to which the fine particles are added as a slurry through the introduction inlet 8a described above reaches a retrorse screw 11, and is retained there and thoroughly melted for the first time. The position of the retrorse screw 11 is preferably adjusted so that after the slurry is added it undergoes melting for about 0–30 seconds. This is because substantially all of the carried fluid from the slurry becomes vaporized and removed at the point when the polyester is completely melted, and therefore no temperature reduction occurs due to loss of heat of vaporization. Consequently, temperature control is facilitated, thus allowing optimum adjustment of the polyester melt viscosity and twin-screw extruder shearing force, and solvolysis of the polymer can therefore be minimized. In addition, in order to adjust the shearing force on the polyester at the stage where the polymer is substantially melted and in the subsequent kneading extrusion, for the prescribed dispersion of the added particles, a disc or rotor may be incorporated into the screw 3 of the extruder.

It is preferred for complete removal of the slurry medium to be accomplished during the period after the polymer has thus been completely melted until the molten polymer reaches the discharge port 4 and for control of molecular decomposition of the polymer, to provide vent openings 9 which lower the pressure in the extruder 1 and remove generated vapor and low-boiling point substances. There are no particular restrictions on the number of vent openings 9, and at least one vent opening may reduce the pressure to 300 torr or lower, preferably 100 torr or lower and more preferably 20 torr or lower.

Since the polyester composition of the invention contains substantially no coarse particles, has uniformly dispersed fine particles and has excellent affinity between the particles and the polyester, it has excellent moldability for molding of fibers, films and resin molded products, thus giving products of excellent quality when used to make fibers, films and resin molded products.

The present invention will now be further illustrated with reference to the examples. The term "parts" in the examples refers to parts by weight.

Also, the physical property values and characteristics according to the invention were measured in the following manner, and are defined as explained below.

(1) Average Particle Size

This is measured using a CP-50 Centrifugal Particle Size Analyzer, product of Shimazu Laboratories. The particle size corresponding to 50 mass percent is read from a cumulative curve for various particle sizes and their contents, calculated based on a centrifugation curve obtained by the aforementioned instrument, and the value is taken as the average particle size (see the book "Particle Measurement Techniques", p.242–247, published 1975 by Nikkan Kogyo Shinbun).

(2) Intrinsic Viscosity of Polyester

This is measured in a mixed solvent of 40 parts 1,1,2,2-tetrachlorethane and 60 parts phenol, at 35° C.

(3) Coarse Particles in Polyester

Fifty mg of the polymer is sandwiched between 2 cover glass plates and melt pressed at 280° C., and after rapid cooling it is observed using a phase contrast microscope, and the particles of maximum length 5.0 $\mu$m or greater in the micrograph are counted with a Luzex 500 image analyzer and judged in the following manner.

Special grade: Absolutely no particles found over 5.0 $\mu$m
First grade: Less than 5 particles/mm$^2$ over 5.0 $\mu$m
Second grade: 5–10 particles/mm$^2$ over 5.0 $\mu$m
Third grade: More than 10 particles/mm$^2$ over 5.0 $\mu$m
Only the special grade and first grade polymer is suitable for practical use.

(4) Filtration Pressure Increase Rate During Filtration of polyester

A constant polymer-feeding apparatus is mounted on the melted polymer outlet side of a small single screw-type extruder, a double layer of 2400 mesh wire filters with an inner diameter of 64 mm$\phi$ is also mounted at the outlet end, and the polymer is continuously filtered for 10 hours at a filtration rate of 33.3 g/min while controlling the temperature of the melted polymer to a constant 290° C. The filtration pressure increase rate at this time is the average value for the pressure increase at the filter inlet end. The particle addition to the filtered polymer at this time is a uniform 0.3 wt %.

Special grade: Filtration pressure increase rate of no greater than 5 kg/cm²/hr.

First grade: Filtration pressure increase rate of 5–10 kg/cm²/hr.

Second grade: Filtration pressure increase rate of 10–20 kg/cm²/hr.

Third grade: Filtration pressure increase rate of greater than 20 kg/cm²/hr.

Only the special grade and first grade polymer is suitable for practical use.

(5) Dispersability of Particles in Polyester

After dilution with polyester (A) if necessary to adjust the amount of particles in the polyester to 0.3 wt %, the polyester extruded with a small single screw-type extruder is embedded in an epoxy resin and cut with a microtome, and the cross-section is observed with a scanning electron microscope (5000–10,000×magnification). The linear distances between 30 pairs of 2 adjacent particles are measured, and the average value, standard deviation and variation coefficient are calculated and judged in the following manner.

Special grade: Variation coefficient of less than 0.05
First grade: Variation coefficient of 0.05–0.1
Second grade: Variation coefficient of 0.1–0.2
Third grade: Variation coefficient of greater than 0.2

Only the special grade and first grade polymer is suitable for practical use.

(6) Affinity of Particles for Polyester

After diluting the polyester with polyester (A) if necessary to adjust the amount of particles in the polyester to 0.3 wt % and drying it at 170° C. for 4 hours, it is melt extruded at 280–300° C. and rapidly cooled with a metal drum surface, to obtain a 140 μm-thick undrawn film. The film is drawn by a factor of 3.5 in the lengthwise direction (longitudinally) at 100° C. and then by a factor of 4.0 in the widthwise direction (laterally) at 120° C., and thereafter subjected to heat fixation at 200° C. for 5 seconds to construct a biaxially oriented film with a thickness of 10 μm. This film is cut to a width of ½ inch and supplied to the film running tester shown in FIG. 4, and the degree of adhesion of powder to a fixed bar 27 after running 90 m of film is visually observed and judged in the following manner.

Special grade: Absolutely no powder produced
First grade: Small amount of powder present in less than ⅓ of the contact area of the fixed bar Second grade: Powder present from ⅓ to ½ of the contact area of the fixed bar
Third grade: Powder present at greater than ½ of the contact area of the fixed bar
Fourth grade: Powder adhering to roughly the entire contact surface of the fixed bar, and powder also present as fly loss around the fixed bar Only the special grade and first grade polymer is suitable for practical use.

Figure 4:
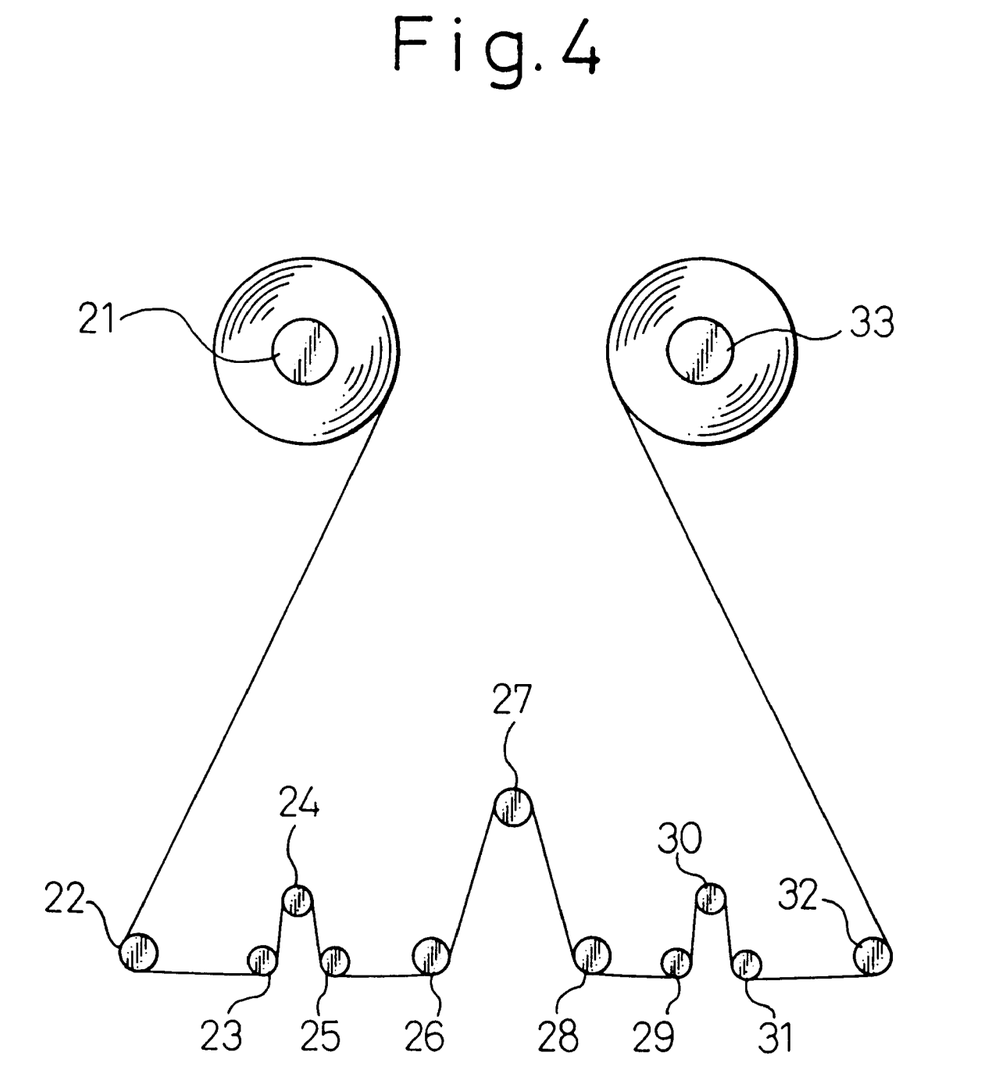
FIG. 4 is a schematic front view of an instrument for measuring the affinity of particles to a polyester.

As a simple explanation of the apparatus shown in FIG. 4, which shows a front view, numeral 21 is a wind-out reel, which is loaded with a test film for measurement of the affinity of the particles for the polyester. Numeral 22 is a tension controller which serves to maintain a constant tension on the test film. Numerals 23, 25, 26, 28, 29, 31 and 32 are rotating free rollers, numerals 24 and 30 are tension detectors for detecting the tension of the film at the entering and exiting ends, and numeral 33 is a wind-up reel. The measuring apparatus constructed in this manner is designed so that the tension of the film contacting the fixed bar 27 is kept constant at all times by the tension controller 2, based on the tension detected by the tension detectors 24 and 30.

(7) Number of Particles with a Given Equivolumetric Sphere Equivalent Diameter

This was measured using a model TA-II Coulter Counter by COULTER ELECTRONICS, INC. The measurement was made using a 0.1 wt % sodium hydroxide aqueous solution in a porous tube with pore sizes of 100 μm. (See "Particle Measurement Techniques", pp.69–79, published 1975 by Nikkan Kogyo Shinbun.)

EXAMPLE 1

Production of Polyester (A)

To a mixture of 100 parts dimethyl terephthalate and 70 parts ethylene glycol there was added 0.038 part of manganese acetate tetrahydrate, and ester-interchange reaction was conducted while slowly raising the temperature from 150° C. to 240° C. After adding 0.025 part of trimethyl phosphate to the resulting reaction mixture and reacting for 15 minutes, 0.045 part of antimony trioxide was added and the reaction was continued for 5 minutes. The temperature was then raised to 290° C., and polycondensation reaction was conducted in a high vacuum of 0.2 Torr or lower, to obtain pellets of a polyester with an intrinsic viscosity of 0.64.

Production of Polyester (B)

To a mixture of 2.8 parts of dimethyl terephthalate, 81.3 parts of dimethyl isophthalate, 15.9 parts of dimethyl 5-sodiumsulfoisophthalate and 103 parts of diethylene glycol there was added 0.0828 part of tetra-n-butyl titanate, and ester-interchange reaction was conducted while slowly raising the temperature from 150° C. to 240° C. After adding 0.00682 part of trimethyl phosphate to the resulting reaction mixture and reacting for 10 minutes the temperature was raised to 290° C., and polycondensation reaction was conducted in a high vacuum of 0.5 Torr or lower, to obtain pellets of a polyester with an intrinsic viscosity of 0.45.

Preparation of Slurry

Twenty parts of polyester (B) was added to 80 parts of water and the internal temperature was raised to 70° C. while slowly stirring. Polyester (B) was thoroughly dissolved while the internal temperature of 70° C. was maintained. A slurry was made by stirring 40 parts of this aqueous solution with 60 parts of anatase-type titanium dioxide with an average particle size of 0.37 μm. The slurry was then supplied to a stirring mill filled with glass beads of average size 0.8 mm and crushed to an average particle size of 0.32 μm. The slurry was filtered with a porous filter using polypropylene as the filter medium, to remove the dirt, etc. The average particle size of the filtered slurry particles was 0.32 μm.

Production and physical properties of polyester composition

After drying 100 parts of polyester (A) at 170° C. for 4 hours, it was fed to the upstream feeding port of a co-rotating twin-screw kneading extruder equipped with 2 feeding ports and 1 vent opening, and 122 parts of the slurry was continuously fed through the downstream feeding port while maintaining a constant polyester (A)/slurry feeding ratio of 100/122 by weight. The vent opening was kept at a vacuum of 10 Torr, and melt extrusion was performed with the resin temperature at 280° C., to obtain pellets of a polyester composition with an intrinsic viscosity of 0.628.

Table 1 gives the results of evaluating the physical properties obtained using the polyester composition pellets and polyester (A).

EXAMPLE 2

Production of Polyester (A)

A mixture of 100 parts of terephthalic bis-β-hydroxyethyl ester, 65 parts terephthalic acid and 29 parts of ethylene glycol was subjected to esterification reaction at a temperature of 210–230° C. The reaction was terminated when the amount of accumulating water produced by the reaction reached 13 parts, and after adding 0.027 part of antimony trioxide and 0.0015 part of orthophosphoric acid to 100 parts of the reaction product, the reaction was continued for 2 minutes. The temperature was then raised to 290° C., and polycondensation reaction was conducted in a high vacuum of 0.2 Torr or lower, to obtain molten polyethylene terephthalate with an intrinsic viscosity of 0.63.

Production of Polyester (B)

To a mixture of 99.1 parts of dimethyl terephthalate, 16.8 parts of dimethyl 5-sodiumsulfoisophthalate, 45.7 parts of ethylene glycol and 42.1 parts of diethylene glycol there was added 0.0484 part of titanium acetate, and ester-interchange reaction was conducted while slowly raising the temperature from 150° C. to 240° C. The temperature of the resulting reaction mixture was raised to 280° C., and polycondensation reaction was conducted in a high vacuum of 0.3 Torr or lower, to obtain a block polyester with an intrinsic viscosity of 0.38.

Preparation of Slurry

To 50 parts of ethylene glycol there was added 50 parts of spherical silica particles with an average size of 0.50 μm obtained by the sol-gel transformation method using tetraethoxysilane as the starting material, and the mixture was stirred to obtain a uniform slurry. Five parts of polyester (B) was added to 100 parts of this slurry, the internal temperature was raised to 95° C. while slowly stirring, and then polyester (B) was thoroughly dissolved while the internal temperature of 95° C. was maintained. The average particle size of the final slurry particles was 0.50 μm.

Production and Physical Properties of Polyester Composition

After drying 100 parts of polyester (A) at 170° C. for 4 hours, it was fed to the downstream feeding port of a co-rotating twin-screw rotor-type extruder equipped with 2 feeding ports and 1 vent opening, while controlling the resin temperature at the outlet end of the extruder to 280° C. with a single-screw extruder, and 0.632 part slurry was continuously fed through the upstream feeding port while maintaining a constant polyester (A)/slurry feeding ratio of 100/0.632 by weight. The vent opening was kept at a vacuum of 3 Torr, and melt extrusion was performed with the resin temperature at 285° C., to obtain pellets of a polyester composition with an intrinsic viscosity of 0.620.

Table 1 gives the results of evaluating the physical properties obtained using the polyester composition pellets and polyester (A).

EXAMPLE 3

Production of Polyester (A)

To a mixture of 100 parts of dimethyl 2,6-naphthalenedicarboxylate and 50 parts of ethylene glycol there was added 0.018 part of manganese acetate tetrahydrate, and ester-interchange reaction was conducted while slowly raising the temperature from 130° C. to 245° C. After completion of the ester-interchange reaction, 0.013 part of trimethyl phosphate was added, after which 0.008 part of titanium acetate was added, the temperature of the reaction product was raised to 295° C., and polycondensation reaction was conducted in a high vacuum of 0.2 Torr or lower, to obtain pellets of a polyethylene-2,6-naphthalate with an intrinsic viscosity of 0.58.

Production of Polyester (B)

To a mixture of 32.4 parts of dimethyl terephthalate, 46.4 parts of dimethyl isophthalate, 21.2 parts of dimethyl 5-sodiumsulfoisophthalate, 13.0 parts of ethylene glycol, 24.5 parts of diethylene glycol and 53.7 parts of 2,2-dimethyl-1,3-propanediol there was added 0.0387 part titanium oxalate, and ester-interchange reaction was conducted while slowly raising the temperature from 150° C. to 240° C. The temperature of the resulting reaction mixture was raised to 280° C., and polycondensation reaction was conducted in a high vacuum of 0.2 Torr or lower, to obtain pellets of a polyester with an intrinsic viscosity of 0.48.

Preparation of Slurry

Twenty parts of tetrahydrofuran was mixed and stirred with 80 parts of crosslinked silicone resin particles with an average size of 0.36 μm obtained by the sol-gel transformation method using methyl trimethoxysilane as the starting material, after which 20 parts of polyester (B) was added, the internal temperature was raised to 50° C. while slowly stirring, for thorough dissolution of polyester (B) to obtain a uniform slurry. The average size of the particles in the slurry was 0.36 μm.

Production and Physical Properties of Polyester Composition

After drying 100 parts of polyester (A) at 180° C. for 4 hours, it was fed to the upstream feeding port of a co-rotating twin rotor-type extruder equipped with 1 feeding port and 1 vent opening, and 40 parts of the slurry was continuously fed through the feeding port while maintaining a constant polyester (A)/slurry feeding ratio of 100/40 by weight. The vent opening was kept at a vacuum of 10 Torr, and melt extrusion was performed with the resin temperature at 295° C., to obtain pellets of a polyester composition with an intrinsic viscosity of 0.560.

Table 1 gives the results of evaluating the physical properties obtained using the polyester composition pellets and polyester (A).

EXAMPLE 4

Production of Polyester (A)

To a mixture of 100 parts of dimethyl 2,6-naphthalenedicarboxylate and 50 parts ethylene glycol there was added 0.018 part of manganese acetate tetrahydrate, and ester-interchange reaction was conducted while slowly raising the temperature from 130° C. to 245° C. After completion of the ester-interchange reaction, 0.013 part of trimethyl phosphate was added, after which 0.008 part of titanium acetate was added, the temperature of the reaction product was raised to 295° C., and polycondensation reaction was conducted in a high vacuum of 0.2 Torr or lower, to obtain a melt of polyethylene-2,6-naphthalate with an intrinsic viscosity of 0.65.

Production of Polyester (B)

To a mixture of 40 parts of dimethyl terephthalate, 60 parts of dimethyl isophthalate and 136 parts of diethylene glycol there was added 0.0463 part titanium oxalate, and ester-interchange reaction was conducted while slowly raising the temperature from 150° C. to 240° C. The temperature of the resulting reaction mixture was raised to 280° C., and polycondensation reaction was conducted in a high vacuum of 0.2 Torr or lower, to obtain pellets of a polyester with an intrinsic viscosity of 0.48.

Preparation of Slurry

Ten parts of polyester (B) was heated to dissolution in 90 parts of β-hydroxyethylethyl ether while stirring at 135° C. under normal pressure. Twenty parts of this solution was then mixed and stirred with 80 parts of crosslinked high molecular particles with an average size of 1.15 μm, synthesized using styrene, ethylene glycol dimethacrylate and divinylbenzene as the starting materials, potassium persulfate as the polymerization initiator and sodium lauryl sulfate as a dispersion stabilizer, to make a slurry. The average size of the particles in the slurry was 1.15 μm.

Production and Physical Properties of Polyester Composition

The slurry was continuously fed to the feeding port of a reverse rotating twin screw-type extruder equipped with 1 feeding port and 2 vent openings, at a rate of 100 parts per hour. The first vent opening was kept at a vacuum of 70 Torr, the second vent opening was kept at a vacuum of 20 Torr, and the slurry was fed to a constant supply apparatus (a) while controlling the slurry temperature to a constant 100° C.

Meanwhile, the molten polyester (A) synthesized previously was fed to a constant supply apparatus (b) in its molten state.

The supply ratio of constant supply apparatus (a):constant supply apparatus (b) was controlled to a constant 0.31:100 for preparation of the polyester composition. Table 1 gives the results of evaluating the physical properties obtained using this polyester composition and polyester (A).

EXAMPLE 5
Production of Polyester (A)

To a mixture of 35.0 parts of dimethyl terephthalate and 22.9 parts of 1,4-butanediol there was added 0.026 part of tetra-n-butyl titanate, and ester-interchange reaction was conducted while slowly raising the temperature from 150° C. to 170° C. After completion of the ester-interchange reaction, the temperature of the reaction product was raised to 245° C., and polycondensation reaction was conducted in a high vacuum of 0.3 Torr or lower, to obtain pellets of polybutylene terephthalate with an intrinsic viscosity of 0.80.

Production of Polyester (B)

To a mixture of 100 parts of dimethyl 2,6-naphthalenedicarboxylate, 18 parts of dimethyl isophthalate, 3 parts of dimethyl 5-sodiumsulfoisophthalate, 40 parts of ethylene glycol, 20 parts of 1,4-butanediol and 62 parts of an ethylene oxide addition product of bisphenol A represented by the following structural formula (m+n=4) there was added 0.05 part of tetra-n-butyl titanate, and ester-interchange reaction was conducted while slowly raising the temperature from 130° C. to 220° C. After completion of the ester-interchange reaction, the temperature of the reaction product was raised to 235° C., and polycondensation reaction was conducted in a high vacuum of 1.0 Torr or lower, to obtain pellets of a polyester with an intrinsic viscosity of 0.63.

Preparation of Slurry

A mixture of 10 parts of polyester (B) and 90 parts of tetrahydrofuran was heated to 60° C. while stirring under normal pressure, to dissolve polyester (B). A uniform slurry was obtained by feeding 100 parts of this solution and 100 parts of carbon black with an average particle size of 0.18 μm to a roll mill. After addition of 10 parts of water to 100 parts of the slurry and thorough mixing and stirring, the mixture was heated to 64° C. under normal pressure until 45 parts of tetrahydrofuran evaporated off. After then adding 10 parts of 1,4-butanediol to the slurry and passing it through a roll mill to make a uniform slurry, 10 parts of water was evaporated off. The slurry was again passed through the roll mill. The average size of the particles in the final slurry was 0.08 μm.

Production and Physical Properties of Polyester Composition

After drying 100 parts of polyester (A) at 190° C. for 3 hours, it was fed to the upstream feeding port of a single screw-type extruder equipped with 2 feeding ports and 1 vent opening, and 25 parts of the slurry was simultaneously fed in a continuous manner through the downstream feeding port while maintaining a constant polyester (A)/slurry feeding ratio of 100/25 by weight. The vent opening was kept at a vacuum of 8 Torr, and melt extrusion was performed with the resin temperature at 245° C., to obtain pellets of a polyester composition with an intrinsic viscosity of 0.770.

Table 1 gives the results of evaluating the physical properties obtained using the polyester composition pellets and polyester (A).

EXAMPLE 6
Production of Polyester (A)

To a mixture of 97 parts of dimethyl terephthalate, 3 parts of dimethyl isophthalate and 70 parts of ethylene glycol there was added 0.038 part of manganese acetate tetrahydrate, and ester-interchange reaction was conducted while slowly raising the temperature from 150° C. to 240° C. After adding 0.025 part of trimethyl phosphate to the resulting reaction mixture and reacting for 15 minutes, 0.045 part of antimony trioxide was added thereto and the reaction was continued for 5 minutes. The temperature was then raised to 290° C., and polycondensation reaction was conducted in a high vacuum of 0.2 Torr or lower to obtain pellets of a polyester with an intrinsic viscosity of 0.60.

Production of Polyester (B)

To a mixture of 2.0 parts of dimethyl terephthalate, 82.1 parts of dimethyl isophthalate, 15.9 parts of dimethyl 5-sodiumsulfoisophthalate and 103 parts of a diethylene glycol there was added 0.0828 part of tetra-n-butyl titanate, and ester-interchange reaction was conducted while slowly raising the temperature from 150° C. to 240° C. After adding 0.00682 part of trimethyl phosphate to the resulting reaction mixture and reacting for 10 minutes, the temperature was raised to 290° C., and polycondensation reaction was conducted in a high vacuum of 0.5 Torr or lower to obtain pellets of a polyester with an intrinsic viscosity of 0.48. This polyester will be referred to as polyester (B-1).

To a mixture of 32.4 parts of dimethyl terephthalate, 46.4 parts of dimethyl isophthalate, 38.1 parts of dimethyl 5-tetrabutylphosphoniumsulfoisophthalate, 13.0 parts of ethylene glycol, 24.5 parts of diethylene glycol and 53.7 parts of 2,2-dimethyl-1,3-propanediol there was added 0.0464 part of titanium oxalate, and ester-interchange reaction was conducted while slowly raising the temperature from 150° C. to 240° C. The temperature of the resulting reaction mixture was raised to 280° C., and polycondensation reaction was conducted in a high vacuum of 0.2 Torr or lower, to obtain pellets of a polyester with an intrinsic viscosity of 0.48. This polyester will be referred to as polyester (B-2).

Preparation of Slurry

To 100 parts of water there was added 40 parts of polyester (B-1), and the mixture was heated at 80° C. while stirring for complete dissolution of polyester (B-1). A uniform slurry was prepared by supplying 50 parts of this solution and 50 parts of rutile-type titanium dioxide of average particle size 0.35 μm which had been surface-modified with silica alumina to a stirring mill filled with glass beads of average size 0.8 mm. This slurry will be referred to as slurry (1).

To 90 parts of tetrahydrofuran there was added 10 parts of polyester (B-2), and the mixture was heated to 60° C. while stirring for complete dissolution of polyester (B-2). A slurry containing particles with an average size of 0.14 μm was prepared by supplying 20 parts of this solution and 80 parts of alumina particles with an average size of 0.19 μm to a stirring mill filled with zirconia beads having an average size of 1.3 mm. This slurry will be referred to as slurry (2).

Production and Physical Properties of Polyester Composition

After drying 100 parts of polyester (A) at 170° C. for 5 hours, it was fed to the upstream feeding port of a co-rotating twin screw-type extruder equipped with 2 feeding ports and 2 vent openings, and 0.503 part of slurry (1) was fed at the same time while 0.317 part of slurry (2) fed to the downstream feeding port, and the feeding was continuously carried out while maintaining a constant polyester (A):slurry (1):slurry (2) feeding ratio of 100/0.503/0.317 by weight. The vent opening was kept at a vacuum of 8 Torr, and melt extrusion was performed with the resin temperature at 245° C., to obtain pellets of a polyester composition with an intrinsic viscosity of 0.770.

Table 1 gives the results of evaluating the physical properties obtained using the polyester composition pellets and polyester (A).

COMPARSTIVE EXAMPLE 1

Production of Polyester (A)

Polyester (A) was obtained in the same manner as Example 1.

Production and Physical Properties of Polyester Composition

After drying 100 parts of polyester (A) at 170° C. for 4 hours, it was fed to the upstream feeding port of a co-rotating twin screw-type extruder equipped with 2 feeding ports and 1 vent opening, and 66.7 parts of anatase-type titanium dioxide with an average particle size of 0.33 μm was continuously fed to the downstream feeding port while maintaining a constant polyester (A)/titanium dioxide feeding ratio of 100/66.7 by weight. The vent opening was kept at a vacuum of 10 Torr, and melt extrusion was performed with the resin temperature at 280° C., to obtain pellets of a polyester composition with an intrinsic viscosity of 0.620.

Table 1 gives the results of evaluating the physical properties obtained using the polyester composition pellets and polyester (A).

COMPARATIVE EXAMPLE 2

Production of Polyester (A)

Polyester (A) was obtained in the same manner as Example 1.

Preparation of Slurry

A slurry was prepared by vigorously mixing 40 parts of water and 60 parts of anatase-type titanium dioxide with an average particle size of 0.37 μm. The slurry was then supplied to a stirring mill filled with glass beads of average size 0.8 mm and crushed to an average particle size of 0.32 μm. The slurry was filtered with a porous filter using polypropylene as the filter medium, to remove the dirt, etc. The average particle size of the filtered slurry particles was 0.32 μm.

Production and Physical Properties of Polyester Composition

After drying 100 parts of polyester (A) at 170° C. for 4 hours, it was fed to the upstream feeding port of a reverse rotating twin screw-type extruder equipped with 2 feeding ports and 1 vent opening, and 111.1 parts of the slurry was continuously fed to the downstream feeding port while maintaining a constant polyester (A)/slurry feeding ratio of 100/111.1 by weight. The vent opening was kept at a vacuum of 10 Torr, and melt extrusion was performed with the resin temperature at 280° C., to obtain pellets of a polyester composition with an intrinsic viscosity of 0.610.

Table 1 gives the results of evaluating the physical properties obtained using the polyester composition pellets and polyester (A).

EXAMPLE 7

Production of Polyester (A)

Polyester (A) was obtained in the same manner as Example 2.

Production of Polyester (B)

Polyester (B) was obtained in the same manner as Example 2.

Preparation of Slurry

Twenty parts of polyester (B) was added to 80 parts of 2-methyl-1,3-dioxolane and the mixture was heated to 70° C. while stirring for thorough dissolution of polyester (B). To 50 parts of this solution there was added 50 parts silica particles of average size 0.38 μm, and after vigorously stirring the mixture it was supplied to a stirring mill filled with zirconia beads of average size 1.1 mm and crushed until the silica particles had an average size of 0.28 μm, to prepare a slurry.

Production and Physical Properties of Polyester Composition

After-drying 100 parts of polyester (A) at 170° C. for 5 hours, it was fed to the upstream feeding port of a co-rotating twin screw-type extruder equipped with 2 feeding ports and 1 vent opening, and 36.6 parts of the slurry was fed simultaneously. The feeding was continuous while maintaining a constant polyester (A)/slurry feeding ratio of 100/36.6 by weight. The vent opening was kept at a vacuum of 3 Torr, and melt extrusion was performed with the resin temperature at 280° C., to obtain pellets of a polyester composition with an intrinsic viscosity of 0.620.

Table 1 gives the results of evaluating the physical properties obtained using the polyester composition pellets and polyester (A).

EXAMPLE 8

Production of Polyester (A)

Polyester (A) was obtained in the same manner as Example 2.

Production of Polyester (B)

Polyester (B) was obtained in the same manner as Example 2.

Preparation of Slurry

Ten parts of polyester (B) was added to 90 parts of 1,3-dioxolane and the mixture was heated to 75° C. while stirring for thorough dissolution of polyester (B). To 50 parts of this solution there was added 50 parts of alumina particles of average size 0.28 μm, and after vigorously stirring the mixture it was supplied to a stirring mill filled with zirconia beads of average size 1.1 mm and crushed until the alumina particles had an average size of 0.24 μm, to prepare a slurry.

Production and Physical Properties of Polyester Composition

After drying 100 parts of polyester (A) at 170° C. for 5 hours, it was fed to the upstream feeding port of a co-rotating twin screw-type extruder equipped with 2 feeding ports and 1 vent opening, and 51.3 parts of the slurry was fed simultaneously. The feeding was continuous while maintaining a constant polyester (A)/slurry feeding ratio of 100/51.3 by weight. The vent opening was kept at a vacuum of 5 Torr, and melt extrusion was performed with the resin temperature at 280° C., to obtain pellets of a polyester composition with an intrinsic viscosity of 0.620.

Table 1 gives the results of evaluating the physical properties obtained using the polyester composition pellets and polyester (A).

EXAMPLE 9

Production of Polyester (A)

Polyester (A) was obtained in the same manner as Example 2.

Production of Polyester (B)

Polyester (B) was obtained in the same manner as Example 3.

Preparation of Slurry

Ten parts of polyester (B) was added to 90 parts of β-hydroxyethylmethyl ether and the mixture was heated to 110° C. while stirring for thorough dissolution of polyester (B). To 50 parts of this solution there was added 50 parts of alumina particles of average size 0.30 μm, and after vigorously stirring the mixture it was supplied to a stirring mill filled with zirconia beads of average size 1.1 mm and crushed until the alumina particles had an average size of 0.22 μm, to prepare a slurry.

Production and Physical Properties of Polyester Composition

After drying 100 parts of polyester (A) at 170° C. for 5 hours, it was fed to the upstream feeding port of a co-rotating twin screw-type extruder equipped with 2 feeding ports and 1 vent opening, and 51.3 parts of the slurry was fed simultaneously. The feeding was continuous while maintaining a constant polyester (A)/slurry feeding ratio of 100/51.3 by weight. The vent opening was kept at a vacuum of 2 Torr, and melt extrusion was performed with the resin temperature at 280° C., to obtain pellets of a polyester composition with an intrinsic viscosity of 0.620.

Table 1 gives the results of evaluating the physical properties obtained using the polyester composition pellets and polyester (A).

TABLE 1

| | Physical properties | | | |
|---|---|---|---|---|
| | Coarse particles | Filtration pressure increase rate | Particle dispersability | Particle affinity |
| Ex. 1 | special grade | special grade | special grade | special grade |
| Ex. 2 | special grade | special grade | special grade | first grade |
| Ex. 3 | special grade | first grade | special grade | special grade |
| Ex. 4 | first grade | special grade | special grade | special grade |
| Ex. 5 | special grade | special grade | first grade | special grade |
| Ex. 6 | special grade | special grade | special grade | special grade |
| Ex. 7 | special grade | special grade | first grade | first grade |
| Ex. 8 | special grade | special grade | first grade | special grade |
| Ex. 9 | special grade | special grade | special grade | special grade |
| Comp. Ex. 1 | third grade | third grade | third grade | fourth grade |
| Comp. Ex. 2 | first grade | second grade | second grade | third grade |

EXAMPLE 10

Production of Polyester (A)

Polyester (A) was obtained in the same manner as Example 1.

Production of Polyester (B)

Polyester (B) was obtained in the same manner as Example 1.

Preparation of Slurry

Ten parts of polyester (B) crushed to a long axis of 0.6–1.2 mm and 90 parts of anatase-type titanium dioxide of average particle size 0.37 μm were fed to a hybridizer (product of Nara Machinery, KK.) and processed at 8000 rpm for one hour. The average size of the processed composite particles was 0.34 μm. A slurry was prepared by vigorously mixing 60 parts of these particles and 40 parts of water. The slurry was then supplied to a stirring mill filled with glass beads of average size 0.8 mm to obtain a uniform slurry. The slurry was then filtered with a porous filter using polypropylene as the filter medium, to remove the dirt, etc. The average particle size of the filtered slurry particles was 0.34 μm.

Production and Physical Properties of Polyester Composition

After drying 100 parts of polyester (A) at 170° C. for 4 hours, it was fed to the upstream feeding port of a co-rotating twin screw-type extruder equipped with 2 feeding ports and 1 vent opening, and 100 parts of the slurry was fed continuously to the downstream feeding port while maintaining a constant polyester (A)/slurry feeding ratio of 100/100 by weight. The vent opening was kept at a vacuum of 8 Torr, and melt extrusion was performed with the resin temperature at 285° C., to obtain pellets of a polyester composition with an intrinsic viscosity of 0.625.

Table 2 gives the results of evaluating the physical properties obtained using the polyester composition pellets and polyester (A).

EXAMPLE 11

Production of Polyester (A)

Polyester (A) was obtained in the same manner as Example 2.

Production of Polyester (B)

Polyester (B) was obtained in the same manner as Example 2.

Preparation of Slurry

Thirty parts of polyester (B) was added to 70 parts of warm water at 60° C. and stirred to dissolution. To 20 parts of this solution there was added 80 parts of crosslinked silicone resin particles with an average size of 0.45 μm obtained by the sol-gel transformation method using methyl trimethoxysilane as the starting material, and the mixture was stirred and mixed to obtain a uniform slurry. The slurry was then heated to 68° C. and the water was removed under a vacuum of 200 Torr. Fifty parts of these particles was added to a mixed solvent of 30 parts of ethylene glycol and 20 parts of water and stirred and mixed to obtain a slurry. The slurry was then supplied to a stirring mill filled with glass beads of average size 0.8 mm to obtain a uniform slurry. The average particle size of the slurry particles was 0.45 μm.

Production and Physical Properties of Polyester Composition

After drying 100 parts of polyester (A) at 170° C. for 4 hours, it was fed to the downstream feeding port of a co-rotating twin rotor-type extruder equipped with 2 feeding ports and 1 vent opening, using a single-screw extruder while controlling the resin temperature to 280° C. at the outlet end of the single-screw extruder, and 0.8 part of the slurry was continuously fed through the upstream feeding port while maintaining a constant polyester (A)/slurry feeding ratio of 100/0.8 by weight. The vent opening was kept at a vacuum of 2 Torr, and melt extrusion was performed with the resin temperature at 280° C., to obtain pellets of a polyester composition with an intrinsic viscosity of 0.620.

Table 2 gives the results of evaluating the physical properties obtained using the polyester composition pellets and polyester (A).

EXAMPLE 12

Production of Polyester (A)

Polyester (A) was obtained in the same manner as Example 3.

Production of Polyester (B)

Polyester (B) was obtained in the same manner as Example 3.

Preparation of Slurry

Thirty parts of polyester (B) was added to 70 parts of silica particles with an average size of 0.25 µm obtained by the sol-gel transformation method using tetraethoxysilane as the starting material, and the mixture was kneaded for one hour at 280° C. in a vacuum of 1.5 Torr. The mixture was cooled to room temperature and crushed to particles with a 1 mm long axis. A slurry was made by adding 80 parts of the particles to 20 parts of tetrahydrofuran and maintaining an internal temperature of 55° C. while stirring. The slurry was then supplied to a stirring mill filled with zirconia beads of average size 1.0 mm to obtain a slurry containing particles with an average size of 0.25 µm.

Production and Physical Properties of Polyester Composition

After drying 100 parts of polyester (A) at 170° C. for 4 hours, it was fed to the feeding port of a co-rotating twin rotor-type extruder equipped with 1 feeding port and 1 vent opening, and 55 parts of the slurry was continuously fed to the feeding port at the same time while maintaining a constant polyester (A)/slurry feeding ratio of 100/55 by weight. The vent opening was kept at a vacuum of 5 Torr, and melt extrusion was performed with the resin temperature at 295° C., to obtain pellets of a polyester composition with an intrinsic viscosity of 0.555.

Table 2 gives the results of evaluating the physical properties obtained using the polyester composition pellets and polyester (A).

EXAMPLE 13

Production of Polyester (A)

A uniform slurry was made with 100 parts of 2,6-naphthalenedicarboxylic acid and 58 parts of ethylene glycol, and was continuously fed to an upright mixing vat with a vertical thermosiphon reboiler in a ratio of 5 parts per hour, for esterification reaction at 285° C. The esterification reaction product was continuously extracted at 3.4 parts each hour, while titanium acetate was continuously added at 0.00034 parts each hour, the temperature was raised to 290° C., and polycondensation reaction was conducted at a high vacuum of 0.8 Torr, to obtain a continuous melt of polyethylene-2,6-naphthalate with an intrinsic viscosity of 0.63.

Production of Polyester (B)

Polyester (B) was obtained in the same manner as Example 4.

Preparation of Slurry

Ten parts of polyester (B) was heated to dissolution in 90 parts of β-hydroxyethylethyl ether while stirring at 130° C. under normal pressure. Twenty parts of this solution was then evenly sprayed onto 100 parts of crosslinked high molecular particles with an average size of 1.0 µm, synthesized using styrene, methyl methacrylate and divinylbenzene as the starting materials, potassium persulfate as the polymerization initiator and sodium lauryl sulfate as a dispersion stabilizer, and then dried under reduced pressure. A uniform slurry was then prepared by vigorously stirring 60 parts of these particles with a mixed solvent containing 30 parts of water and 10 parts of β-hydroxyethylethyl ether. The average size of the particles in the slurry was 1.0 µm.

Production and Physical Properties of Polyester Composition

The slurry was continuously fed to the first feeding port of a reverse rotating twin screw-type extruder equipped with 2 feeding ports and 2 vent openings, at a rate of 100 parts per hour, while molten polyester (A) was continuously fed to the second feeding port at 100 parts per hour, while maintaining a constant slurry/polyester (A) feeding ratio of 100/100 by weight. The first vent opening was kept at a vacuum of 60 Torr, the second vent opening was kept at a vacuum of 15 Torr, and extrusion was carried out while controlling the resin temperature to a constant 293° C. at the outlet end of the extruder. Thus were obtained pellets of a polyester composition with an intrinsic viscosity of 0.62.

Table 2 gives the results of evaluating the physical properties obtained using the polyester composition pellets and polyester (A).

EXAMPLE 14

Production of Polyester (A)

Polyester (A) was obtained in the same manner as Example 5.

Production of Polyester (B)

Polyester (B) was obtained in the same manner as Example 5.

Preparation of Slurry

A mixture of 10 parts of polyester (B) and 90 parts of tetrahydrofuran was heated to 60° C. while stirring under normal pressure, to dissolve polyester (B). A Coatomizer (product of Freund Industries, KK.) was used for jet coating of 100 parts of the solution on 100 parts of carbon black with an average particle size of 0.18 Am. After stirring and mixing 80 parts of these particles, 15 parts of 1,4-butanediol and 5 parts of water, the slurry was passed through a roll mill to make a uniform slurry. The average size of the particles in the slurry was 0.09 µm.

Production and Physical Properties of Polyester Composition

After drying 100 parts of polyester (A) at 190° C. for 3 hours, it was fed to the upstream feeding port of a single screw-type extruder equipped with 2 feeding ports and 1 vent opening, and 30 parts of the slurry was simultaneously fed in a continuous manner through the downstream feeding port while maintaining a constant polyester (A)/slurry feeding ratio of 100/30 by weight. The vent opening was kept at a vacuum of 8 Torr, and melt extrusion was performed with the resin temperature at 245° C., to obtain pellets of a polyester composition with a considerably small drop in the intrinsic viscosity, to an intrinsic viscosity of 0.770.

Table 2 gives the results of evaluating the physical properties obtained using the polyester composition pellets and polyester (A).

EXAMPLE 15

Production of Polyester (A)

Polyester (A) was obtained in the same manner as Example 6.

Production of Polyester (B)

Polyester (B-1) and polyester (B-2) were obtained in the same manner as Example 6.

Preparation of Slurry

Ten parts of powder of polyester (B-1) crushed to a long axis of 1 mm and 90 parts of rutile-type titanium dioxide of average particle size 0.35 µm which had been surface-modified with silica alumina were fed to a hybridizer (product of Nara Machinery, KK.) and processed at 6000 rpm for 30 minutes. The average size of the processed composite particles was 0.34 µm. After vigorously mixing 60 parts of these particles and 40 parts of water, the mixture was supplied to a stirring mill filled with glass beads of average size 0.8 mm to prepare a uniform slurry. The average particle size of the particles in the slurry was 0.32 µm. This slurry will be referred to as slurry (1).

To 20 parts of molten polyester (B-2) there was added 80 parts of alumina particles with an average size of 0.19 µm, and after thorough kneading of the mixture at 270° C. under a high vacuum of 0.8 Torr, it was made into pellets. A slurry was prepared by adding 20 parts of the pellets to 80 parts of tetrahydrofuran and heating to 60° C. while stirring. The mixture was then supplied to a stirring mill filled with zirconia beads of average size 1.2 mm to prepare a uniform slurry. The average particle size of the particles in the slurry was 0.14 µm. This slurry will be referred to as slurry (2).
Production and Physical Properties of Polyester Composition After drying 100 parts of polyester (A) at 170° C. for 5 hours, it was fed to the upstream feeding port of a co-rotating twin screw-type extruder equipped with 2 feeding ports and 2 vent openings, and 0.7 part of slurry (1) was fed at the same time, while 0.3 part of slurry (2) was fed to the downstream feeding port, and the feeding was continuously carried out while maintaining a constant polyester (A):slurry (1):slurry (2) feeding ratio of 100/0.7/0.3 by weight. The vent opening was kept at a vacuum of 8 Torr, and melt extrusion was performed with the resin temperature at 245° C., to obtain pellets of a polyester composition with an intrinsic viscosity of 0.580.

Table 2 gives the results of evaluating the physical properties obtained using the polyester composition pellets and polyester (A).

EXAMPLE 16

Production of Polyester (A)

Polyester (A) was obtained in the same manner as Example 2.

Production of Polyester (B)

Polyester (B) was obtained in the same manner as Example 2.

Preparation of Slurry

Twenty parts of polyester (B) was added to 80 parts of 2-methyl-1,3-dioxolane and the mixture was heated to 70° C. while stirring for dissolution of polyester (B). To 10 parts of this solution there was added 90 parts of crosslinked silicone resin particles with an average size of 0.45 µm obtained by the sol-gel transformation method using methyl trimethoxysilane as the starting material, and the mixture was stirred and mixed to obtain a uniform slurry. The slurry was then heated to 70° C. and the solvent was removed under a vacuum of 100 Torr. Fifty parts of these particles was added to a mixed solvent of 20 parts of 2-methyl-1,3-dioxolane and 30 parts of water and stirred and mixed to obtain a slurry. The slurry was then supplied to a stirring mill filled with glass beads of average size 0.8 mm to obtain a uniform slurry. The average size of the particles in the slurry was 0.45 µm.

Production and Physical Properties of Polyester Composition

After drying 100 parts of polyester (A) at 170° C. for 4 hours, it was fed to the upstream feeding port of a co-rotating twin screw-type extruder equipped with 2 feeding ports and 2 vent openings, using a single-screw extruder while controlling the resin temperature to 280° C. at the outlet end of the single-screw extruder, and 15 parts of the slurry was continuously fed through the downstream feeding port while maintaining a constant polyester (A)/slurry feeding ratio of 100/15 by weight. The first vent opening was kept at a vacuum of 3 Torr while the second vent opening was kept at a vacuum of 1.2 Torr, and melt extrusion was performed with the resin temperature at 280° C., to obtain pellets of a polyester composition with an intrinsic viscosity of 0.620.

Table 2 gives the results of evaluating the physical properties obtained using the polyester composition pellets and polyester (A).

EXAMPLE 17

Production of Polyester (A)

Polyester (A) was obtained in the same manner as Example 2.

Production of Polyester (B)

Polyester (B) was obtained in the same manner as Example 2.

Preparation of Slurry

Ten parts of polyester (B) was added to 90 parts of 1,3-dioxolane and the mixture was heated to 70° C. while stirring for dissolution of polyester (B). To 10 parts of this solution there was added 90 parts of crosslinked silicone resin particles with an average size of 0.45 µm obtained by the sol-gel transformation method using methyl trimethoxysilane as the starting material, and the mixture was stirred and mixed to obtain a uniform slurry. The slurry was then heated to 60° C. and the solvent was removed under a vacuum of 100 Torr. Sixty parts of these particles was added to a mixed solvent of 10 parts of 1,3-dioxolane and 30 parts of water and then stirred and mixed to obtain a slurry. The slurry was then supplied to a stirring mill filled with glass beads of average size 0.8 mm to obtain a uniform slurry. The average size of the particles in the slurry was 0.45 µm.

Production and Physical Properties of Polyester Composition

After drying 100 parts of polyester (A) at 170° C. for 4 hours, it was fed to the upstream feeding port of a co-rotating twin screw-type extruder equipped with 2 feeding ports and 2 vent openings, using a single-screw extruder while controlling the resin temperature to 280° C. at the outlet end of the single-screw extruder, and 30 parts of the slurry was continuously fed through the downstream feeding port while maintaining a constant polyester (A)/slurry feeding ratio of 100/30 by weight. The first vent opening was kept at a vacuum of 5 Torr while the second vent opening was kept at a vacuum of 1.5 Torr, and melt extrusion was performed with the resin temperature at 285° C., to obtain pellets of a polyester composition with an intrinsic viscosity of 0.615.

Table 2 gives the results of evaluating the physical properties obtained using the polyester composition pellets and polyester (A).

EXAMPLE 18

Production of Polyester (A)

Polyester (A) was obtained in the same manner as Example 2.

Production of Polyester (B)

Polyester (B) was obtained in the same manner as Example 3.

Preparation of Slurry

Ten parts of polyester (B) was added to 90 parts of β-hydroxyethylmethyl ether and the mixture was heated to 110° C. while stirring for dissolution of polyester (B). To 20 parts of this solution there was added 80 parts of alumina particles of average size 0.30 µmy and after stirring and mixing the mixture was supplied to a stirring mill filled with zirconia beads of average size 1.1 mm to obtain a uniform slurry. The slurry was then heated to 80° C. and the solvent was removed under a vacuum of 100 Torr. Sixty parts of these particles was added to a mixed solvent of 20 parts of β-oxyethyl methyl ether and 20 parts of ethylene glycol and stirred and mixed to obtain a slurry. The slurry was then supplied to a stirring mill filled with glass beads of average size 0.8 mm to obtain a uniform slurry. The average size of the particles in the slurry was 0.28 µm.

Production and Physical Properties of Polyester Composition

After drying 100 parts of polyester (A) at 170° C. for 4 hours, it was fed to the upstream feeding port of a co-rotating twin screw-type extruder equipped with 2 feeding ports and 2 vent openings, using a single-screw extruder while controlling the resin temperature to 280° C. at the outlet end of the single-screw extruder, and 30 parts of the slurry was continuously fed through the downstream feeding port while maintaining a constant polyester (A)/slurry feeding ratio of 100/30 by weight. The first vent opening was kept at a vacuum of 4 Torr while the second vent opening was kept at a vacuum of 1.2 Torr, and melt extrusion was performed with the resin temperature at 285° C., to obtain pellets of a polyester composition with an intrinsic viscosity of 0.620.

Table 2 gives the results of evaluating the physical properties obtained using the polyester composition pellets and polyester (A).

TABLE 2

| | Physical properties | | | |
|---|---|---|---|---|
| | Coarse particles | Filtration pressure increase rate | Particle dispersability | Particle affinity |
| Ex. 10 | special grade | special grade | special grade | special grade |
| Ex. 11 | special grade | special grade | special grade | special grade |
| Ex. 12 | special grade | special grade | special grade | special grade |
| Ex. 13 | special grade | first grade | special grade | special grade |
| Ex. 14 | special grade | special grade | special grade | special grade |
| Ex. 15 | special grade | special grade | special grade | special grade |
| Ex. 16 | special grade | special grade | special grade | special grade |
| Ex. 17 | special grade | special grade | special grade | special grade |
| Ex. 18 | special grade | special grade | special grade | first grade |

EXAMPLE 19

Production of Polyester (A)

Polyester (A) was obtained in the same manner as Example 2.

Production of Polyester (B)

Polyester (B) was obtained in the same manner as Example 2.

Preparation of Slurry

A rutile-type titanium oxide with an average particle size of 0.28 μm and containing 10,300 particles per milligram with an equivolumetric sphere equivalent diameter of 4 μm or greater, 25,000 particles per 25 milligram with an equivolumetric sphere equivalent diameter of 3 μm or greater and 1,088,000 particles per milligram with an equivolumetric sphere equivalent diameter of 2 μm or greater was purified to an average particle size of 0.26 μm with 8100 particles per 30 milligram with an equivolumetric sphere equivalent diameter of 4 μm or greater, 15,700 particles per milligram with an equivolumetric sphere equivalent diameter of 3 μm or greater and 147,000 particles per milligram with an equivolumetric sphere equivalent diameter of 2 μm or greater, using a centrifugal classifying air separator. Thirty parts of polyester (B) was added to a mixed solvent containing 50 parts of water and 20 parts of ethylene glycol at 60° C., and the mixture was stirred to dissolution. To 20 parts of this solution there was added 0.005 part of sodium hexametaphosphate and 80 parts of the aforementioned purified titanium oxide, and stirring and mixing produced a uniform slurry. The average size of the particles in the slurry was 0.26 μm, there were 9200 particles per milligram with an equivolumetric sphere equivalent diameter of 4 μm or greater, 15,700 particles per milligram with an equivolumetric sphere equivalent diameter of 3 μm or greater and 147,000 particles per milligram with an equivolumetric sphere equivalent diameter of 2 μm or greater.

Production and Physical Properties of Polyester Composition

After drying 100 parts of polyester (A) at 170° C. for 4 hours, it was fed to the downstream feeding port of a co-rotating twin rotor-type extruder equipped with 2 feeding ports and 1 vent opening, using a single-screw extruder while controlling the resin temperature to 280° C. at the outlet end of the single-screw extruder, and 0.8 part of the slurry was continuously fed through the upstream feeding port while maintaining a constant polyester (A)/slurry feeding ratio of 100/0.8 by weight. The vent opening was kept at a vacuum of 2 Torr, and melt extrusion was performed with the resin temperature at 280° C., to obtain pellets of a polyester composition with an intrinsic viscosity of 0.620.

Tables 3 and 4 give the parameters of the production of the polyester composition and the results of evaluating the physical properties obtained using the polyester composition pellets and polyester (A).

EXAMPLE 20

Production of Polyester (A)

Polyester (A) was obtained in the same manner as Example 3.

Production of Polyester (B)

Polyester (B) was obtained in the same manner as Example 3.

Preparation of Slurry

Seventy parts of titanium oxide from titanium tetrachloride, with an average particle size of 0.18 μm and containing 1,300 particles per milligram with an equivolumetric sphere equivalent diameter of 4 μm or greater, 2,350 particles per milligram with an equivolumetric sphere equivalent diameter of 3 μm or greater and 63,200 particles per milligram with an equivolumetric sphere equivalent diameter of 2 μm or greater, was mixed with 5 parts of polyester (B) and 25 parts of tetrahydrofuran, and the mixture was stirred well while maintaining an internal temperature of 50° C. for dissolution of polyester (B). The mixture was then cooled to room temperature and supplied to a stirring mill filled with zirconia beads of average particle size 1.0 mm, to obtain a slurry containing particles with an average size of 0.08 μm, with 290 particles per milligram with an equivolumetric sphere equivalent diameter of 4 μm or greater, 1,070 particles per milligram with an equivolumetric sphere equivalent diameter of 3 μm or greater and 5,050 particles per milligram with an equivolumetric sphere equivalent diameter of 2 μm or greater.

Production and Physical Properties of Polyester Composition

After drying 100 parts of polyester (A) at 180° C. for 4 hours, It was fed to the feeding port of a co-rotating single rotor-type extruder equipped with 1 feeding port and 1 vent opening, and 55 parts of the slurry was simultaneously fed in a continuous manner through the feeding port while maintaining a constant polyester (A)/slurry feeding ratio of 100/55 by weight. The vent opening was kept at a vacuum of 5 Torr, and melt extrusion was performed with the resin temperature at 295° C., to obtain pellets of a polyester composition with an intrinsic viscosity of 0.555.

Tables 3 and 4 give the parameters of the production of the polyester composition and the results of evaluating the physical properties obtained using the polyester composition pellets and polyester (A).

EXAMPLE 21

Production of Polyester (A)

Polyester (A) was obtained in the same manner as Example 13.

Production of Polyester (B)

Polyester (B) was obtained in the same manner as Example 13.

Preparation of Slurry

Ten parts of polyester (B) was added to 90 parts of β-hydroxyethylethyl ether and the mixture was heated to dissolution at 130° C. under normal pressure while stirring. After evenly spraying 200 parts of this solution onto 100 parts of rutile-type titanium which had been surface-modified with silica/alumina, it was dried under a high-speed air flow. A uniform slurry was then prepared by vigorously stirring 60 parts of these particles with a mixed solvent containing 30 parts of water and 10 parts of B-hydroxyethylethyl ether.

The average size of the particles in the slurry was 0.35 μm, and there were 1300 particles per milligram with an equivolumetric sphere equivalent diameter of 4 μm or greater, 3600 particles per milligram with an equivolumetric sphere equivalent diameter of 3 μm or greater and 55,000 particles per milligram with an equivolumetric sphere equivalent diameter of 2 μm or greater.

Production and Physical Properties of Polyester Composition

The above-mentioned slurry was continuously fed to the first feeding port of a reverse rotating twin screw-type extruder equipped with 2 feeding ports and 2 vent openings at 100 parts each hour and molten polyester (A) was continuously fed through the second feeding port at 100 parts each hour, while maintaining a constant slurry/polyester (A) feeding ratio of 100/100 by weight. The first vent opening was kept at a vacuum of 60 Torr, the second vent opening was kept at a vacuum of 15 Torr, and extrusion was performed with the resin temperature at the outlet end of the extruder controlled to a constant 293° C., to obtain pellets of a polyester composition with an intrinsic viscosity of 0.62.

Tables 3 and 4 give the parameters of the production of the polyester composition and the results of evaluating the physical properties obtained using the polyester composition pellets and polyester (A).

EXAMPLE 22

Production of Polyester (A)

Polyester (A) was obtained in the same manner as Example 5.

Production of Polyester (B)

To a mixture of 100 parts of dimethyl 2,6-naphthalenedicarboxylate, 18 parts of dimethyl isophthalate, 3 parts of dimethyl 5-sodiumsulfoisophthalate, 40 parts of ethylene glycol, 20 parts of 1,4-butanediol and 62 parts of an ethylene oxide dimer addition product of bisphenol A there was added 0.05 part of tetra-n-butyl titanate, and ester-interchange reaction was conducted while slowly raising the temperature from 130° C. to 220° C. After completion of the ester-interchange reaction, the temperature of the reaction product was raised to 235° C., and polycondensation reaction was conducted in a high vacuum of 1.0 Torr or lower to obtain pellets of a polyester with an intrinsic viscosity of 0.63.

Preparation of Slurry

A mixture of 10 parts of polyester (B) and 90 parts of tetrahydrofuran was heated to 60° C. while stirring under normal pressure, to dissolve polyester (B). A uniform slurry was obtained by feeding 100 parts of this solution, 40 parts of rutile-type titanium oxide of average particle size of 0.50 μm and 60 parts of anatase-type titanium oxide of average particle size 0.33 μm to a roll mill. After addition of 10 parts of water to 100 parts of the slurry and thorough mixing and stirring, the mixture was heated to 64° C. under normal pressure until 45 parts of tetrahydrofuran evaporated off. After then adding 10 parts of 1,4-butanediol to the slurry and passing it through a roll mill to make a uniform slurry, 10 parts of water was evaporated off. The slurry was again passed through the roll mill. The average size of the particles in the final slurry was 0.40 μm, and there were 3500 particles per milligram with an equivolumetric sphere equivalent diameter of 4 μm or greater, 7600 particles per milligram with an equivolumetric sphere equivalent diameter of 3 μm or greater and 105,000 particles per milligram with an equivolumetric sphere equivalent diameter of 2 μm or greater.

Preparation and Physical Properties of Particle-Containing Polyester

After drying 100 parts of polyester (A) at 190° C. for 3 hours, it was fed to the upstream feeding port of a single screw-type extruder equipped with feeding ports at 2 locations and a vent opening at one location, and 25 parts of the slurry was simultaneously fed in a continuous manner through the downstream feeding port while maintaining a constant polyester (A)/slurry feeding ratio of 100/25 by weight. The vent opening was kept at a vacuum of 8 Torr, and melt extrusion was performed with the resin temperature at 245° C., to obtain pellets of a polyester with a considerably small drop in the intrinsic viscosity, to an intrinsic viscosity of 0.770.

Tables 3 and 4 give the parameters of the production of the polyester composition and the results of evaluating the physical properties obtained using the polyester pellets and polyester (A).

EXAMPLE 23

Production of Polyester (A)

Polyester (A) was obtained in the same manner as Example 6.

Production of Polyester (B)

Polyester (B-1) and polyester (B-2) were obtained in the same manner as Example 6.

Preparation of Slurry

To 100 parts of water there was added 40 parts of polyester (B-1), and the temperature of the mixture was raised to 80° C. while stirring for complete dissolution of polyester (B-1). A uniform slurry was prepared by supplying 50 parts of this solution and 50 parts of rutile-type titanium oxide of average particle size 0.35 μm which had been surface-modified with silica/alumina to a stirring mill filled with glass beads with an average size of 0.8 mm. This slurry will be referred to as slurry (1). The average size of the particles in slurry (1) was 0.30 μm, and there were 330 particles per milligram with an equivolumetric sphere equivalent diameter of 4 μm or greater, 800 particles per milligram with an equivolumetric sphere equivalent diameter of 3 μm or greater and 8300 particles per milligram with an equivolumetric sphere equivalent diameter of 2 μm or greater.

To 90 parts of tetrahydrofuran there was added 10 parts of polyester (B-2), and the mixture was heated to 60° C. while stirring for complete dissolution of polyester (B-2). A uniform slurry was prepared by supplying 20 parts of this solution and 80 parts of anatase-type titanium oxide with an average size of 0.34 μm to a stirring mill filled with zirconia beads having an average size of 1.3 mm. This slurry will be referred to as slurry (2). The average size of the particles in slurry (2) was 0.32 μm, and there were 900 particles per 2 mg with an equivolumetric sphere equivalent diameter of 4 μm or greater, 3600 particles per milligram with an equivolumetric sphere equivalent diameter of 3 μm or greater and 25,400 particles per milligram with an equivolumetric sphere equivalent diameter of 2 μm or greater.

Preparation and Physical Properties of Particle-Containing Polyester

After drying 100 parts of polyester (A) at 170° C. for 5 hours, it was fed to the upstream feeding port of a co-rotating twin screw-type extruder equipped with feeding ports at 2 locations and vent openings at 2 locations, and 0.503 part of slurry (1) was simultaneously fed while 0.317 part of slurry (2) fed to the downstream feeding port, and the feeding was continuously carried out while maintaining a constant polyester (A):slurry (1):slurry (2) feeding ratio of 100/0.503/0.317 by weight. The vent opening was kept at a vacuum of 8 Torr, and melt extrusion was performed with the resin temperature at 245° C., to obtain pellets of a polyester with an intrinsic viscosity of 0.770.

Tables 3 and 4 give the parameters of the production of the polyester composition and the results of evaluating the physical properties obtained using the polyester pellets and polyester (A).

TABLE 3

| | Polyester (A) | | Polyester (B) | Fine particles | | | | Average particle size | Slurry concentration | Particle density in product |
|---|---|---|---|---|---|---|---|---|---|---|
| | — | IV | IV | Type | CC4 | CC3 | CC2 | μm | % | % |
| Ex. 19 | PET | 0.63 | 0.38 | titanium oxide | 9200 | 15700 | 147000 | 0.26 | 80 | 0.6 |
| Ex. 20 | PEN | 0.58 | 0.48 | titanium oxide | 290 | 1070 | 5050 | 0.08 | 70 | 28 |
| Ex. 21 | PEN | 0.63 | 0.48 | titanium oxide | 1300 | 3600 | 55000 | 0.35 | 60 | 38 |
| Ex. 22 | PBT | 0.8 | 0.63 | titanium oxide | 3500 | 7600 | 105000 | 0.4 | 77 | 16 |
| Ex. 23 | PET /IA | 0.6 | 0.48 | titanium oxide | 330 | 800 | 8300 | 0.3 | 50 | 0.5 |
| | | | 0.48 | titanium oxide | 900 | 3600 | 25400 | 0.32 | 80 | |

TABLE 4

| | Physical properties | | | |
|---|---|---|---|---|
| | Coarse particles | Filtration pressure increase rate | Particle dispersability | Particle affinity |
| Ex. 19 | special grade | special grade | special grade | special grade |
| Ex. 20 | special grade | special grade | special grade | special grade |
| Ex. 21 | special grade | special grade | special grade | special grade |
| Ex. 22 | special grade | special grade | special grade | special grade |
| Ex. 23 | special grade | special grade | special grade | special grade |

EXAMPLE 24

Polyethylene terephthalate (PET) chips with an intrinsic viscosity of 0.648 were dried at 170° C. for 4 hours using the vented twin-screw extruder shown in FIG. 1 and were then loaded at 100 kg/h through the polymer loading port of the extruder, after which a slurry obtained in the same manner as Example 1 was added thereto to a titanium content of 10% based on the weight of the composition. The loading nozzle was set at a height of 5 cm from the cylinder, and an air-exhaust ventilator was used for suction removal of the generated vapor from the slurry vapor outlet. During this time the extruder cylinder temperature was kept to 290° C., and the vent 10 was reduced to a pressure of 10 Torr. After 7 hours of continuous operation to confirm the stability of the process, the composition was taken out as a sample. The results of evaluating the resulting composition are shown in Table 5.

EXAMPLES 25–27

Compositions were obtained under the same conditions as in Example 24, except that the construction of the vented twin-screw extruder and the composition of the slurry were as listed in Table 5. The results of the evaluation were as shown in Table 5.

EXAMPLE 28

A polyester composition was produced under the same conditions as Example 24, except that the polyester was changed from PET to polyethylene-2,6-naphthalate. The results of evaluating the resulting polyester composition are listed in Table 5.

As is clear from the results shown in Table 5, the polyester compositions of Examples 24–28 were all stable during the production process, the dispersability evaluation results were satisfactory, and the reduction in the limiting viscosity was also minimal. In addition, the results of evaluating the coarse particles and filtration pressure increase rate were all special grade or first grade.

TABLE 5

| | Vented extruder construction | Type of particles added | Particle content (wt %) | Slurry medium | Slurry concentration (wt %) | Intrinsic viscosity | Coarse particles | Filtration pressure increase rate | Process stability |
|---|---|---|---|---|---|---|---|---|---|
| Ex. 24 | FIG. 1 | titanium oxide | 10 | water | 70 | 0.632 | special grade | special grade | good |
| Ex. 25 | FIG. 1, with 15 cm nozzle height | same as above | 50 | water | 70 | 0.621 | special grade | special grade | good |
| Ex. 26 | FIG. 1, with 25 cm nozzle height | titanium oxide | 50 | water | 70 | 0.621 | first grade | first grade | good |
| Ex. 27 | FIG. 2 | same as above | 25 | water | 50 | 0.625 | special grade | special grade | good |
| Ex. 28 | FIG. 1 | titanium oxide | 10 | water | 70 | 0.661 | special grade | special grade | good |

What is claimed is:

1. A process for preparing a polyester composition, which comprises the steps of:

preparing a slurry of fine particles with an average size of from 0.03–1.8 μm and a polyester (B) in water and/or an organic compound with a boiling point of 240° C. or below, or preparing a slurry of said fine particles with an average size of from 0.03–1.8 μm which have had their surface modified with the polyester (B) in water and/or an organic compound with a boiling point of 240° C. or below;

feeding a polyester (A) and said slurry to a single-rotary-member or twin-rotary-member vented extruder; and melt kneading said polyester (A) and said slurry, wherein said polyester (A) comprises dry pellets of a polyester of which at least 70 mole percent of the repeating units consist of ethylene terephthalate, butylene terephthalate or ethylene naphthalate units, and said polyester (B) comprises a polyester of which less than 70 mole percent of the repeating units consist of ethylene tereplithalate, butylene terephthalate or ethylene naphthalate units.

2. The process according to claim 1, wherein an outlet for discharge of the slurry medium vapor is provided in said vented extruder, and said slurry is introduced through a slurry introducing nozzle which opens into the outlet while at least part of said polyester (A) is in a non-molten state.

3. The process according to claim 1, wherein the amount of said fine particles is 0.01–70 wt % based on said polyester (A).

4. The process according to claim 1, wherein the amount of said polyester (B) is 0.01–40 wt % based on said fine particles.

5. The process according to claim 1, wherein said fine particles comprise no more than 20,000 particles per milligram which have an equivolumetric sphere equivalent diameter of 3 μm or greater, no more than 220,000 particles per milligram which have an equivolumetric sphere equivalent diameter of 2 μm or greater, and an average particle size of 0.05–0.60 μm.

6. The process according to claim 5, wherein said fine particles have a particle distribution such that the number ratio of particles with an equivolumetric sphere equivalent diameter of 4 μm or greater to particles with an equivolumetric sphere equivalent diameter of 3 μm or greater is in the range of 1:5 to 1:2, while the number ratio of particles with an equivolumetric sphere equivalent diameter of 3 μm or greater to particles with an equivolumetric sphere equivalent diameter of 2 μm or greater is in the range of 1:10 to 1:2.

7. A process for preparing a polyester composition, which comprises the steps of:

preparing a slurry of fine particles with an average size of from 0.03–1.8 μm and a polyester (B) in water and/or an organic compound with a boiling point of 240° C. or below, or preparing a slurry of said fine particles with an average size of from 0.03–1.8 μm which have had their surface modified with the polyester (B) in water and/or an organic compound with a boiling point of 240° C. or below;

feeding a polyester (A) and said slurry to a single-rotary-member or twin-rotary-member vented extruder, having an outlet for discharge of slurry medium vapor, while at least part of said polyester (A) is in a non-molten state; and melt kneading said polyester (A) and said slurry, wherein said polyester (A) comprises dry pellets of a polyester of which at least 70 mole percent of the repeating units consist of ethylene tereplithalate, butylenes terephthalate or ethylene naphthalate units, and said polyester (B) comprises a polyester of which less than 70 mole percent of the repeating units consist of ethylene terephthalate, butylenes terephthalate or ethylene naphthalate units.

* * * * *